Oct. 1, 1963  A. H. COTTRELL ETAL  3,105,804
NUCLEAR REACTORS
Filed Nov. 18, 1958
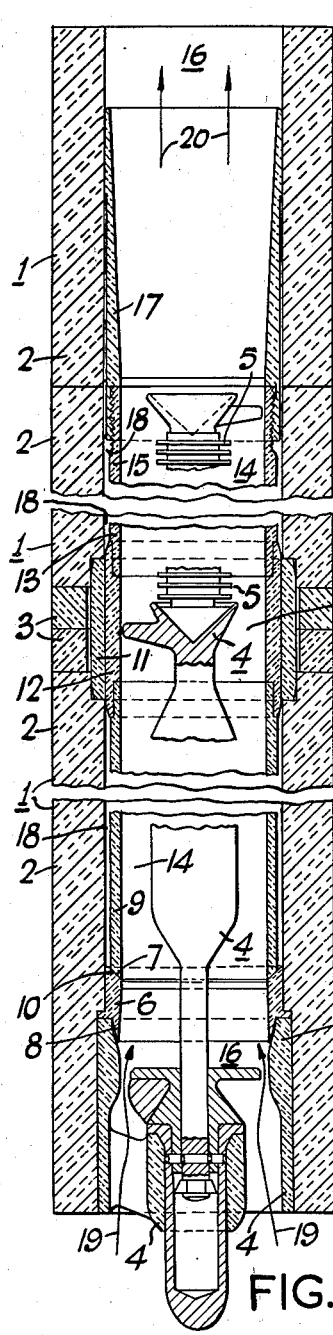
FIG.I.
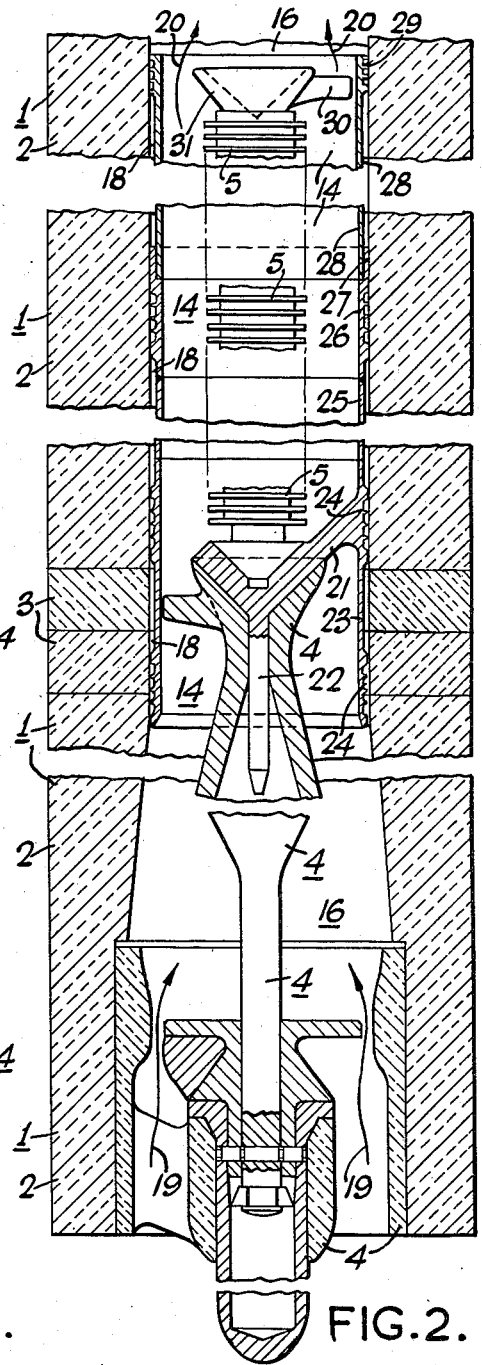
FIG.2.
INVENTORS:
ALAN HOWARD COTTRELL and MICHAEL
WARWICK THOMPSON
Attorneys for Applicants 3,105,804
NUCLEAR REACTORS
Alan Howard Cottrell, Cambridge, and Michael Warwick Thompson, Harwell, England, assignors to United Kingdom Atomic Energy Authority, London, England
Filed Nov. 18, 1958, Ser. No. 774,756
Claims priority, application Great Britain July 15, 1958
2 Claims. (Cl. 204—193.2)

This invention relates to nuclear reactors.

In a graphite moderate reactor, energy is stored in the graphite as a result of neutron bombardment. If the graphite is raised above the operating temperature there may under some conditions be a self sustaining release of this energy accompanied by a rise in temperature. This is the so-called "Wigner release." It is possible to reduce the rate of accumulation of this stored energy, thereby reducing the risk of an accidental release, by raising the temperature at which the graphite is irradiated.

The current design of graphite-moderated nuclear reactor, having fuel element channels formed in the graphite moderator, results in a graphite temperature distribution fairly closely related to the distribution of coolant temperature in the fuel element channels; namely, relatively low temperatures where the coolant gas enters the moderator and relatively high temperatures where the coolant leaves the moderator. However, depending upon the moderator design, a number of leakage paths usually exist between the fuel element channels and the spaces between the graphite bricks forming the moderator, so that coolant reaches parts of the moderator to keep it at a lower temperature than corresponding parts of the fuel element channels despite the fact that a moderate amount of heat (e.g. 6%) is generated in the moderator.

It is an object of the present invention to provide means capable of securing a more acceptable temperature distribution in the moderator structure of a graphite-moderated nuclear reactor having in mind the need to avoid self-sustained release of Wigner energy.

The invention resides in a graphite moderated nuclear reactor having a graphite moderator structure penetrated by a series of channels with fuel elements in the channels and means for passing coolant through the channels characterised in that the channels are lined with tubular members spaced from the moderator structure and means are provided confining coolant flow to pass through said members so that the moderator is compelled to operate in excess of the coolant temperature. For optimum results the degree of spacing of the tubular members from the moderator structure is governed by two main considerations. In the first place the spacing should not be so insignificant that heat conduction across the gap is so large that the moderator temperature follows too closely the temperature of the tubular members, and in the second place the spacing should not be so large that convection can take place in the gap to transfer heat from the hotter moderator to the cooler tubular members. A gap which allows heat transfer which is divided roughly equally between conduction, convection and radiation is suitable.

Typically, with graphite sleeve 0.3" thick as the tubular members a gap of 0.15" is suitable.

The tubular members may consist of a plurality of sleeves arranged end to end in which case the means for confining coolant flow to the channels in the moderator structure depends largely for its form on the constructional features of the moderator. For a moderator as disclosed in British Patent No. 784,292 sealing would be required along the length of the tubular members and at their bottom ends. Where the tubular members are formed as a column of stacked sleeves, sealing would be required either at the contacting end faces of the sleeves or some form of sealing rings would be required in the vicinity of the graphite tiles which space the graphite blocks apart.

The tubular members may be of graphite, as mentioned above, or they may be tubes of any other suitable material with a low neutron absorption cross-section such as, for example, magnesium, beryllium, beryllia, zirconium or silicon carbide. They should be made removable (particularly if they are made of graphite as the graphite will store Wigner energy and may require either replacement or annealing outside the reactor).

Embodiments of the invention will now be described, by way of example, with reference to the accompanying drawings wherein FIGS. 1 and 2 are cross-sectional elevations of fuel element channels in a nuclear reactor.

In FIG. 1 there is shown a column 1 of square section graphite blocks 2 standing on their end and separated by graphite tiles 3 in a manner disclosed in U.K. Patent No. 784,292. The base of the column is fitted with a fuel element support unit 4 (such as disclosed in U.K. Patent No. 783,094) and the unit 4 carries a column of fuel elements 5 and a graphite collar 6 having a conical upper end 7 and a tapered lower end 8 adapted to provide a smooth flow passage between the support 4 and a bottom graphite sleeve 9. The sleeve 9 has a conical face 10 mating with the conical end 7 of the collar 6. In the region of the tiles 3 a graphite sealing collar 11 is fitted as the graphite blocks are assembled. The sleeve 9 terminates in a junction piece 12 which is a close fit in the sealing collar 11. A further sleeve 13 fits in the junction piece 12 so that the sleeves 9, 13 can be stacked one upon the other to form a continuous passageway 14, ending in a sleeve 15, in a channel 16, in the column 1. The end sleeve 15 is fitted with a tapered end piece 17. Typical dimensions are as follows: the graphite blocks 2 have a side dimension of 8" and the channel 16 in the column 1 has a diameter of 5.06". The external diameter of the sleeves 9, 13, 15 is 4.76" thus providing gaps 18 between sleeves and blocks of 0.15". The internal diameter of the sleeves 9, 13, 15 is 4.17". Fuel elements are accommodated in the passageway 14 resting on the support 4 and a coolant for the fuel elements passes through the support 4 as indicated by the arrows 19 and thence along the passageway 14 to be discharged through the end piece 17 (arrows 20). An annulus of gas exists in the gaps 18 to reduce heat transfer between the column 1 and the sleeves 9, 13, 15. This annulus of gas is nearly static, a certain amount of minor movement occurring both with convection in the gap and with slight leakages through the joints between sleeves and at the conical faces 7, 10. The sealing collar 11 puts a seal over the principal potential leakage path, namely the path that exists along the keyways in the tiles 3.

In FIG. 2, the same reference numerals are used as in FIG. 1 for identical components.

There is shown in FIG. 2 a column 1 of square section graphite blocks 2 standing on their end and separated by graphite tiles 3 in a manner disclosed in U.K. Patent No. 784,292. The base of the column is fitted with a fuel element support unit 4 (such as disclosed in U.K. Patent No. 783,094) and the unit 4 carries a conical spider 21 having a locating peg 22 penetrating into the support unit 4. The spider 21 is integral with a tube 23 having labyrinth ends 24. A plain section of tube 25 is welded to the tube 23 and an end labyrinth section 25 is welded to the tube 25. The section 26 is cut away at 27 to accommodate the lower end of a removable plain tube 28 having a labyrinth section at its upper end also cut away to accommodate another tube 28 and so on along the column until the uppermost tube 28 is reached with a labyrinth section 29. A column of fuel elements 5 rests on the conical spider 21 and is located by spider arms 30 associated with end caps 31 on the fuel elements. A continuous passageway 14 exists through the tubes and the tubes form, with a channel 16 through the column 1, an annular gap 18 of about 0.15" to reduce heat transfer between the column 1 and the tubes. The labyrinth sections in the tubes reduce flow of gas along the annular gap 18 which would assist heat transfer across the gap 18.

The arrangement of FIG. 1 is suited to reactors yet to be constructed and the arrangement of FIG. 2 is suited to reactors already constructed.

We claim:

1. In a nuclear reactor having a moderator structure defining a fuel element channel through which fluid coolant is passed, a substantially fluid-tight tubular liner, means mounting the liner in the channel adjacent to but spaced from the wall of the channel by an annular heat insulating gap, said gap being filled with gas, and means associated with the liner for maintaining the gas in nearly static disposition in the gap.

2. A nuclear reactor according to claim 1 wherein said liner is of graphite and has a thickness of 0.3 inch and said gap has a thickness of 0.15 inch.

References Cited in the file of this patent

UNITED STATES PATENTS

| | | |
|---|---|---|
| 2,741,593 | Metcalf et al. | Apr. 10, 1956 |
| 2,831,807 | McGary | Apr. 22, 1958 |
| 2,832,733 | Szilard | Apr. 29, 1958 |
| 2,910,418 | Creutz | Oct. 27, 1959 |